United States Patent [19]

Tawil et al.

[11] Patent Number: 5,572,027

[45] Date of Patent: Nov. 5, 1996

[54] INTEGRATED DOSIMETER FOR SIMULTANEOUS PASSIVE AND ACTIVE DOSIMETRY

[75] Inventors: Riad A. Tawil, Kirtland, Ohio; Sam S. Hsu, Farmingham, Mass.

[73] Assignee: Saint-Gobain/Norton Industrial Ceramics Corp., Worcester, Mass.

[21] Appl. No.: 371,694

[22] Filed: Jan. 12, 1995

[51] Int. Cl.⁶ .................... G01T 1/11; G01T 1/15; G01J 1/02

[52] U.S. Cl. .................... 250/336.1; 250/370.07; 250/390.03; 250/394; 250/378; 250/337; 250/389; 250/482.1

[58] Field of Search .................... 250/336.1, 370.07, 250/390.03, 394, 361 R, 378, 389, 337, 482.1

[56] References Cited

U.S. PATENT DOCUMENTS

| | | | |
|---|---|---|---|
| 2,793,298 | 7/1954 | Landsverk | 250/378 |
| 4,465,936 | 8/1984 | Ishiguro et al. | 250/390.03 |
| 4,546,251 | 10/1985 | Schaffer | 250/337 |
| 4,642,463 | 2/1987 | Thoms | 250/336.1 |
| 4,876,454 | 10/1989 | Burgess | 250/370.14 |
| 4,975,589 | 12/1990 | Chamberlain et al. | 250/484.1 |
| 4,999,503 | 3/1991 | Andru | 250/482.1 |
| 5,004,921 | 4/1991 | Moscovitch | 250/390.03 |
| 5,055,691 | 10/1991 | Burgess | 250/370.07 |
| 5,059,801 | 10/1991 | Burgess | 250/370.14 |
| 5,065,031 | 11/1991 | Moscovitch | 250/482.1 |
| 5,083,028 | 1/1992 | Decossas et al. | 250/390.03 |
| 5,173,609 | 12/1992 | Lacoste et al. | 250/370.07 |
| 5,177,363 | 1/1993 | Velbeck et al. | 250/337 |

FOREIGN PATENT DOCUMENTS

| | | | |
|---|---|---|---|
| 1134286 | 5/1989 | Japan | 250/482.1 |

OTHER PUBLICATIONS

Campos, Investigation of Teflon Electrect Detectors for Beta Dosimetry p. 216 (Nuclear Instruments and Methods in Physics Research (1986).

Dessauer, Photographic Neutron Dosimetry to Date, University of Rochester, Sep. 14, 1948 (AECD–2278, US Atomic Energy Commission).

E. Casal et al., Experimental Comparison of Automatic TLD Readout Systems, Radiation Protection Dosimetry vol. 30 No. 1 pp. 23–31 Nuclear Technology Publishing. 1990.

Dositec, Electronic Dosimetry Manual Version 3.1, Section I, pp. 1–71 Jan. 1993.

Dosimeter Model L36 Test Results, University of Massachusetts, Dositec Facility, Publication No. 0001–0793–00 Jul. 1993.

Moscovitch et al., Letter to the Editor, Nuclear Technology Publishing, Radiation Protection Dosimetry vol. 42 No. 1 pp. 57–59 (1992).

(List continued on next page.)

*Primary Examiner*—Constantine Hannaher
*Assistant Examiner*—Virgil Orlando Tyler
*Attorney, Agent, or Firm*—Volker R. Ulbrich; Don W. Bulson

[57] ABSTRACT

A radiation monitoring system and method characterized by the use of paired active and passive radiation detectors to monitor exposure to a radiation field. The active detector provides an output representative of radiation exposure on a real time basis while the passive detector is readable on a delayed basis after exposure to radiation for a period of time to provide an output representative of radiation exposure over said period of time. Respective readers are provided for extracting the radiation exposure information from the detectors, as is a processor which determines a quantity of radiation exposure from the radiation information extracted from the detectors. The processor corrects radiation exposure data derived from one of the detectors using radiation exposure data derived from the other of the detectors.

17 Claims, 4 Drawing Sheets

OTHER PUBLICATIONS

Kramer et al., Software to Maintain Dosimeter Chain of Custody and Health Physics Records, Harshaw/Bicron Radiation Measurement Products, Jul. 11–15, 1993.

Moscovitch, Dose Algorithms for Personal Thermoluminescence Dosimetry, Nuclear Techology Publishing, Radiation Protection Dosimetry vol. 47, No. 1/4 pp. 373–380 (1993).

Moscovitch et al., A TLD System Based on Gas Heating With Linear Time–Temperature Profile, Nuclear Technology Publishing, Radiation Protection Dosimetry, vol. 34 No. 1/4 pp. 361–364 (1990).

Duftschmid et al., Automated TLD Systems: What Can We Expect From The Market Today?, Nuclear Technology Publishing, Radiation Protection Dosimetry, vol. 34 No. 1/4 pp. 339–343 (1990).

Dositec Electronic Dosimetry System User's Manual, Jan. 1993.

INTEGRATED DOSIMETER FOR SIMULTANEOUS PASSIVE AND ACTIVE DOSIMETRY

The present invention relates generally to radiation dosimetry and, more particularly, to a novel concept of integrating an active (real time) dosimeter with a passive (delayed readout) dosimeter in a unified package.

BACKGROUND OF THE INVENTION

Two major technologies are in use today to monitor radiation exposure from ionizing radiation. The technologies are generally categorized as passive, or delayed readout, dosimetry and active, or real time, dosimetry. Passive dosimeters have included, for example, TLD-based dosimeter elements, bubble-based dosimeter elements, polycarbonate-based dosimeter elements, photographic film-based dosimeter elements, indium-based dosimeter elements, sulphur-based dosimeter elements, quartz-based dosimeter elements or gold-based dosimeter elements, or the like. Active dosimeters have used, for example, silicon diodes, photodiodes, GM tubes, ionization chambers, electrets, MOSFETs and DRAMs, or the like, as the radiation sensitive elements for providing real time monitoring of radiation levels.

The two different technologies each have advantages and drawbacks not associated with the other. For example, TLD (thermoluminescence dosimetry) can be used to satisfy strict performance requirements demanded by various governmental bodies or other entities that cannot be fully met by active dosimeters presently available in the marketplace. On the other hand, TLD does not lend itself to real time monitoring of radiation whereas as active dosimeters are commonly used today as indicators to provide a warning when radiation exposure exceeds a prescribed level.

SUMMARY OF THE INVENTION

The present invention uniquely integrates passive and active radiation monitoring technologies to provide a dosimeter method and system, and components thereof, that provide advantages exceeding the sum of those afforded by the technologies individually. A radiation monitoring system and method according to the invention are characterized by the use of paired active and passive radiation detectors to monitor exposure to a radiation field. The active detector provides an output representative of radiation exposure on a real time basis while the passive detector is readable on a delayed basis after exposure to radiation for a period of time to provide an output representative of radiation exposure over said period of time.

In a preferred embodiment, the passive detector and active detector are physically connected together as a unitary package. The passive detector includes at least one radiation sensitive element selected from the group consisting of a TLD-based dosimeter element, bubble-based dosimeter element, polycarbonate-based dosimeter element, photographic film-based dosimeter element, indium-based dosimeter element, sulphur-based dosimeter element, quartz-based dosimeter element and gold-based dosimeter element, or the like. The active detector includes at least one radiation sensitive element selected from the group consisting of a silicon diode, photodiode, GM tube, ionization chamber, electret, MOSFET and DRAM, or the like.

Further in accordance with a preferred embodiment, the dosimeter assembly comprises a housing, and the active and passive detectors respectively include an electronic radiation sensitive element and a TL element within the housing. The housing may include a case and a holder removably attached to the case, the case containing the electronic radiation sensitive element, and the holder containing the TL element. A substrate for carrying the TL element is removably carried by the holder, and the holder may include one or more filters overlying the TL element or elements.

According to another aspect of the invention, there is provided a conversion device for converting an active dosimeter, that provides an output representative of radiation exposure on a real time basis, to an integrated active and passive dosimeter assembly. The conversion device includes a holder attachable to the case of the active dosimeter to form therewith a unitary package, and at least one non-electronic dosimeter element carried by the holder. As is preferred, the holder is removably attachable to the case and includes a socket for slidably receiving the case.

According to still another aspect of the invention, a radiation monitoring method comprises the steps of using paired active and passive radiation detectors to monitor exposure to a radiation field, the active detector providing an output representative of radiation exposure on a real time basis while the passive detector is readable on a delayed basis after exposure to radiation for a period of time to provide an output representative of radiation exposure over such period of time. Radiation exposure data derived from one of the detectors may be used to correct or otherwise modify the exposure information derived from the other detector. For example, data obtained from the passive detector may be used to determine radiation energies and mixed field composition, which information may then be used to correct the response data of the active detector to obtain a more accurate radiation exposure history. The active and passive detectors may be simultaneously calibrated and/or have a multi-point calibration performed on each.

According to a further aspect of the invention, a radiation monitoring system comprises a plurality of radiation dosimeters each comprising a passive detector and an active detector physically connected together as a unitary package. The active detector provides an output representative of radiation exposure on a real time basis, and the passive detector is readable on a delayed basis after exposure to radiation for a period of time to provide an output representative of radiation exposure over the period of time. Respective readers are provided for extracting the radiation exposure information from the detectors, as is a processor which determines a quantity of radiation exposure from the radiation information extracted from the detectors. The processor corrects or otherwise modifies radiation exposure data derived from one of the detectors using radiation exposure data derived from the other of the detectors.

In a preferred embodiment, the radiation monitoring system includes an electronic memory for storing the incremental radiation exposure information provided by the active detector at intervals over said period of time. The reader for the active detector extracts the incremental radiation information from the active detector for providing a history of readings over the period of time, and said processor modifies or otherwise corrects the radiation exposure history using the radiation exposure data derived from the passive detector.

According to yet another aspect of the invention, a radiation dosimeter assembly comprises a housing, at least one non-electronic radiation sensitive element carried by the housing and readable on a delayed basis after exposure to radiation for a period of time to provide an output representative of radiation exposure over such period of time, at least one electronic radiation sensitive element carried by the housing for providing an output representative of radiation exposure on a real time basis, and an electronic circuit responsive to the output of the electronic radiation sensitive element for producing an alarm if the output of the electronic radiation sensitive element satisfies a predetermined criteria.

The foregoing and other features are hereinafter described and particularly pointed out in the claims, the following description and the annexed drawings setting forth in detail an illustrative embodiment of the invention, this being indicative, however, of but one of the various ways in which the principles of the invention may be employed.

DETAILED DESCRIPTION

Figure 1:
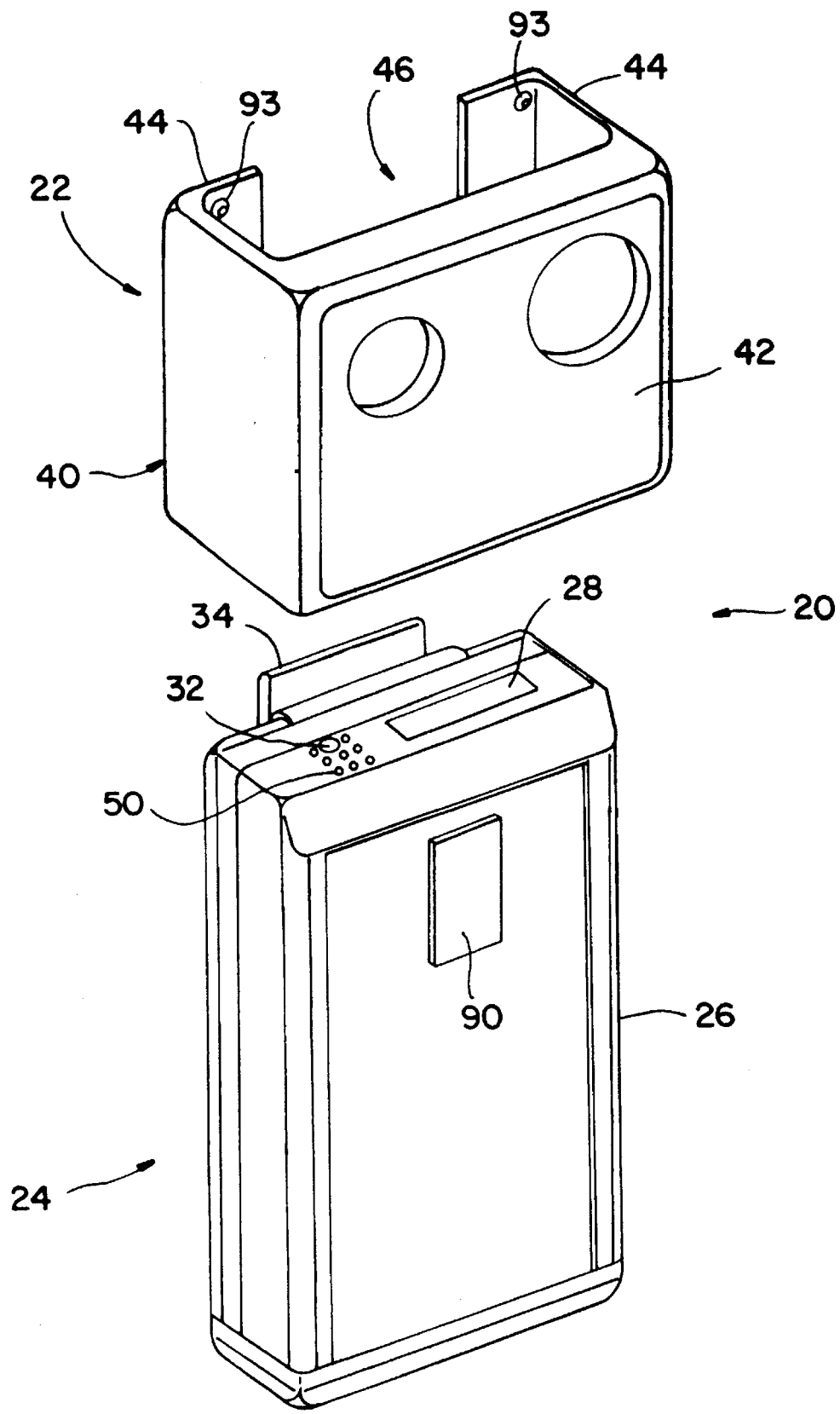
FIG. 1 is an exploded perspective view of an active/passive dosimeter assembly according to the invention, the assembly including an active detector and a passive detector.
Figure 2:
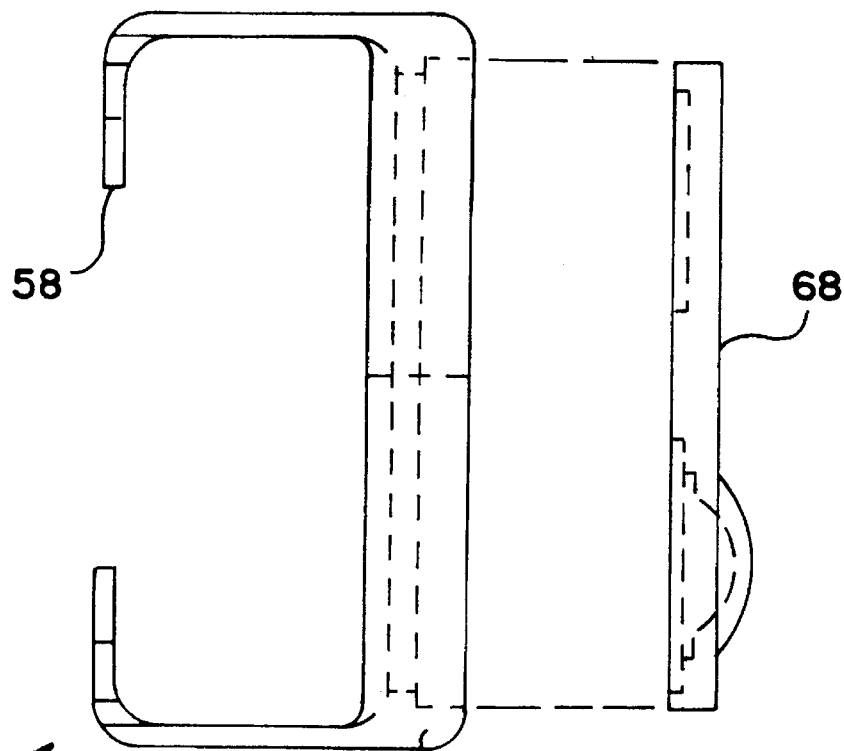
FIG. 2 is a top plan view of a holder for the passive demeanor with a front wall plate exploded away from the base of the holder.
Figure 3:
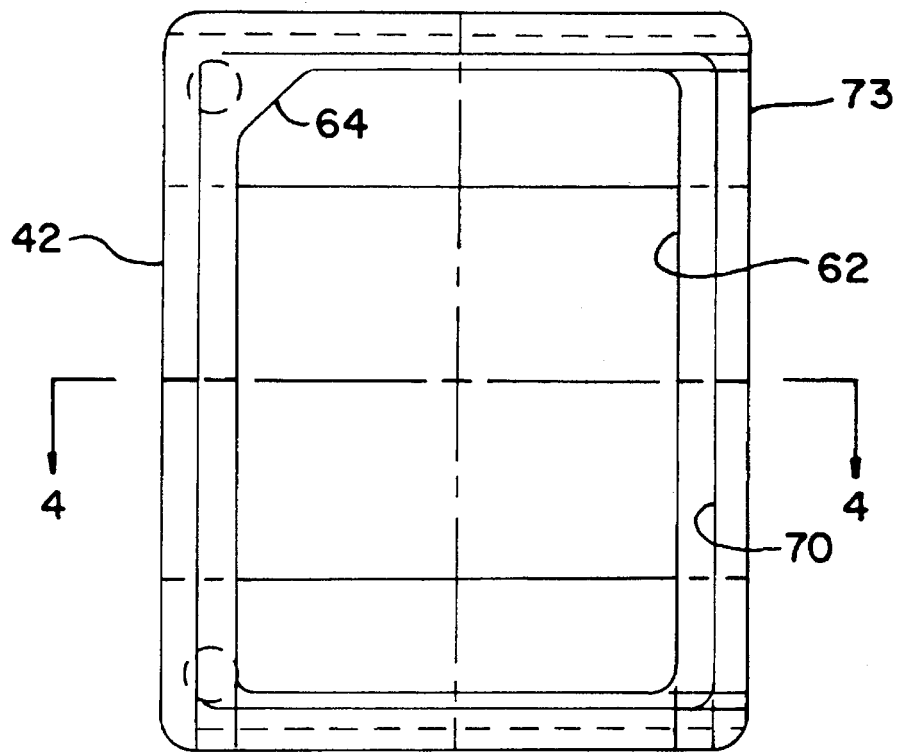
FIG. 3 is a front view of the base of the holder.
Figure 4:
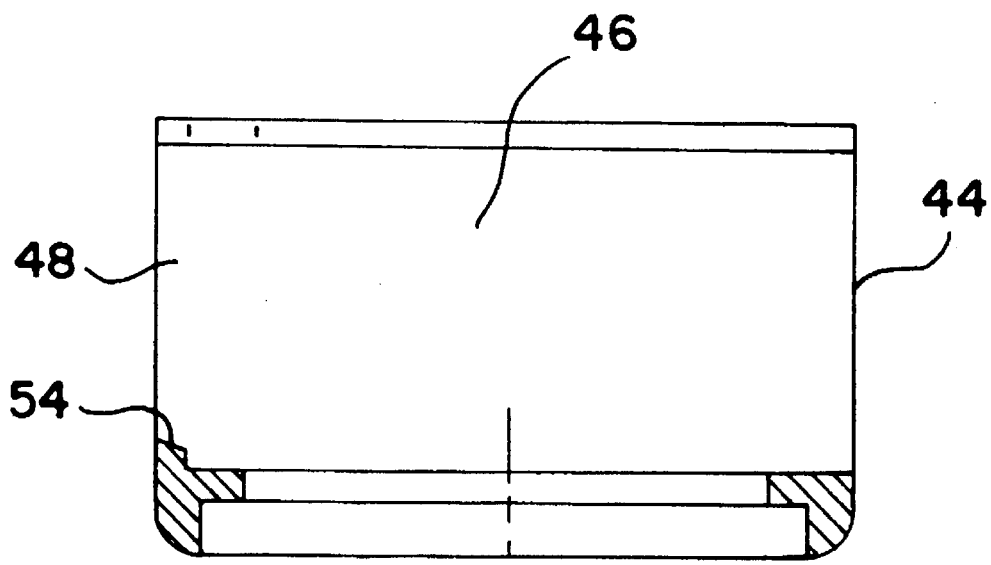
FIG. 4 is a sectional view of the holder asked along the line 4—4 of FIG. 3.

Referring now in detail to the drawings, an exemplary dosimeter assembly according to the invention is indicated generally by reference numeral 20 in FIG. 1. The dosimeter assembly 20 comprises a passive detcetor 22 and an active detector 24. As is preferred, the passive detector and active detector are physically connected together as a unitary package. The active demeanor provides an output representative of radiation exposure on a real time basis whereas the passive detector is readable on a delayed basis after exposure for a period of time to provide an output representative of radiation exposure over such period of time. The passive detector may be used for primary dose reporting while the active detector may be used for real time dose reporting, access control and/or as a backup.

In the illustrated embodiment, the active detector 24 is a conventional electronic dosimeter. More particularly, the demeanor 24 is an active real time electronic Model L36 dosimeter (the details of which are hereby incorporated herein by reference) available from Dositec, Inc. of Framingham, MA. The Model L36 dosimeter is accurate, reliable, rugged, lightweight, and designed for nuclear power plants, nuclear facilities, hospitals, dentists, schools, radiologists and individuals.

The active detector 24 contains an energy compensated, solid-state silicon radiation sensitive element and a microprocessor to monitor the radiation rate and dose level, all housed in a case 26 made of high impact plastic and equipped with a clip 34 for attachment to clothing at various body locations. A 3-digit LCD display 28 provides an indication of the dose and/or dose rate. In addition to recording dose and dose rate, the detector 24 provides: a dose and dose rate alarm, chirper, reminder and stay time alarm, and dose history. In addition to an audible alarm, an LED 32 gives a visual indication of the alarm condition.

With additional reference to FIGS. 2–6, the passive detector 22 of the illustrated embodiment includes a conventional TLD card 38 and a novel form of holder 40 which is adapted for attachment to the case 26 of the active detector 24 to form a unitary package. More particularly, the holder 40 includes a base 42 and two rearwardly extending L-shape arms 44 that form with the base a socket 46 for slip-fitting over the top end of the case 26. The socket 46 has an opening 48 at its top end generally coextensive with the top of the case 26 to permit viewing of the LED 32 and LCD display 28. The opening 48 also permits unobstructed passage of sound emitted through holes 50 (FIG. 1) from the audible alarm (chirper). The forward edge of the opening 48 is bounded by an inwardly projecting lip 54 (Figure 4) which functions as a stop to prevent the holder from being telescoped too far over the case 26, so as not to overlie the radiation sensitive element of the active detector located in the lower region of the case 26. The inturned ends of the L-shape arms 44 define therebetween a slot 58 accommodating the clip 34 when the holder is slid over the case 26. The holder is made of durable, tissue-equivalent, ABS plastic.

Figure 5:
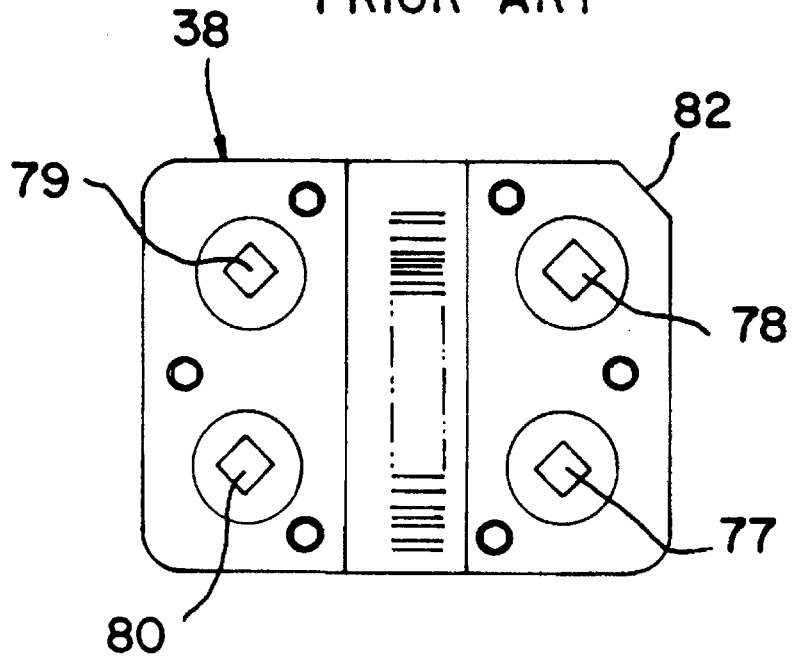
FIG. 5 is a plan view of a TLD card.
Figure 6:
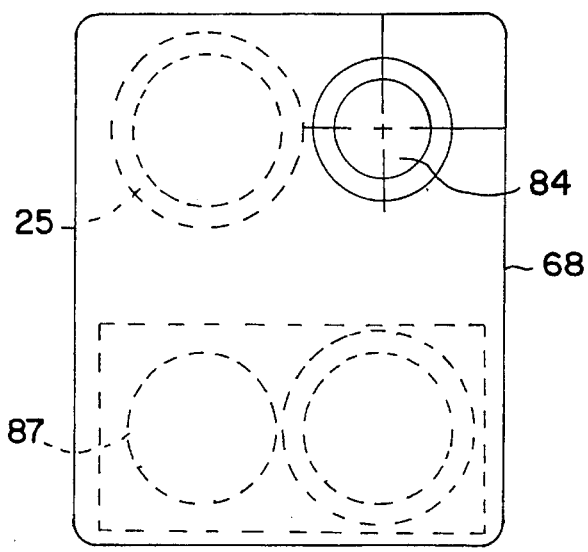
FIG. 6 is a front view of the front wall plate of the holder.
Figure 7:
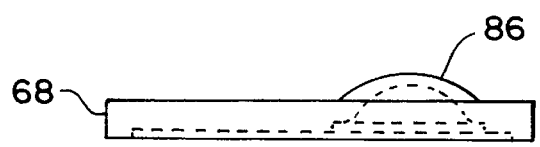
FIG. 7 is an end view of the front wall plate.

The base 42 includes a rectangular shape pocket 62 sized to accommodate the TLD card 38 (FIG. 5). One corner of the pocket is beveled to form a key 64 for proper orienting of the card in the pocket; the card can only fit one way in the pocket. The pocket may be circumscribed by an annular gasket (not shown) for sealing against the front wall of the case 26 of the active detector.

The bottom of the pocket 62 is formed by a front wall 68 of the holder base 42. The front wall may be formed by a separate plate secured as by a suitable bonding agent in a recess 70 in a border portion 72 of the holder base. The front wall includes a window and/or various filters for respective radiation sensitive elements of the TLD card 38. As shown in FIG. 5, the TLD 38 consists of four LiF:Mg,Ti thermoluminescence (TL) elements 77–80 of different thicknesses and compositions mounted in known manner between two Teflon (PTFE) sheets on an aluminum substrate. Each TL element is covered by its own unique filter which provides different radiation absorption thicknesses to allow dose estimation for various organs in risk. The TL elements 77–80 are located in positions designated 1–4, respectively. The TLD card is identified by a label with an ID Number appearing in both numeric and barcode formats. One corner of the card is notched at 82 to insure proper insertion into the holder and correct orientation when being read in a card reader.

The illustrated TLD card and filtration corresponds to that of a conventional 8825 Dosimeter (the details of which are incorporated herein by reference) sold by Harshaw/Bicron Radiation Measurement Products, Solon, Ohio. The TL element 79 in position 3 is a thin solid TLD-700 phosphor (Lithium-7 enriched fluoride) having a preferred thickness of 0.006 inch. This element is protected from the environment by filter 85 which is a thin aluminized Mylar® sheet having a preferred thickness of 0.0015 inch and a density thickness of 17 mg/cm$^2$. The thin aluminized Mylar® sheet corresponds to an open window 84 in the holder. The response of element 79 provides a basis for shallow dose estimation. As a result of the small thickness of element 79, underestimation of shallow dose contribution of low energy beta rays is reduced. The small thickness of both the element and filter provide for reduced energy dependent response to low energy beta particles.

TL elements 77, 78 and 80 in positions 1, 2 and 4, respectively, each are a thicker TLD-700 phosphor having a preferred thickness of 0.015 inch. Element 78 is covered by filter 86 to provide a basis for deep dose estimation. The filter 86 has a density thickness substantially greater than 250 mg/cm$^2$ and preferably 1000 mg/cm$^2$ (0.040 inch thick ABS and 0.162 inch thick PTFE) to minimize the contribution of high energy beta rays ($^{90}$Sr$^{20}$Y) to the deep dose response and to provide tissue equivalent absorption thickness as close as possible to the actual depth in tissue where deep dose estimation is desired. This results in smaller correction factors to be applied to the response of the TL element in position 2 when the deep dose index is estimated. Reference may be had to U.S. Pat. No. 4,975,589 for further details, said patent hereby being incorporated herein by reference.

Element 77 is covered by filter 87 including a copper filter element. The variation with energy of the photon attenuation characteristics of the copper filter element located in position 1 gives the dosimeter the ability to act as an energy spectrometer for low energy photons. The filter covering the element 77 is composed of 0.091 inch ABS plastic having a density thickness of 240 mg/cm$^2$ and 0.004 inch thick copper having a density thickness of 91 mg/cm$^2$.

TL element 80 in position 4 is covered by 0.091 thick ABS plastic having a density thickness of 240 mg/cm$^2$ and a 0.004 inch thick tin filter element 25 having a density thickness of 463 mg/cm$^2$. The variation with energy of the photon attenuation characteristics of the tin filter element located in position 4 gives the dosimeter the ability to act as an energy spectrometer for intermediate energy photons.

The illustrated dosimeter assembly preferably also includes a neutron sensitive element 90 (FIG. 1) in the form of a strip of CR39 or other polycarbonate material. The CR39 strip 90 may be conveniently sandwiched between the TLD card and the case 26 of the active detector when the holder is slipped over the case 26.

The above described holder is particularly suited for converting an existing active dosimeter to an integrated passive-active dosimeter assembly. However, those skilled in the art will readily appreciate that the detectors may be otherwise integrated together, such as by incorporation into a common case. If the passive detector component of the dosimeter assembly employs a TLD card such as that above described, then preferably the case has a removable cover (preferably tamperproof) for permitting removal of the TLD card (and/or any other passive detector element) for reading the TLD card (and/or any other passive detector element).

For reading of the radiation sensitive elements of the passive detector 22 in the illustrated embodiment, the holder may be slipped off the case 26 of the active detector 24 to permit removal of the TLD card 38 and CR39 strip 90. After reading of the TLD card and the CR39 strip in their respective readers in known manner, the dosimeter may be reassembled as above described. Detents 93 may be provided for releasably engaging in recesses on the back side of the case 26 to aid in retaining the holder on the case. When the holder is assembled to the case, together they may be considered a housing for containing the active and passive radiation sensitive elements.

The dosimeter assembly 20 is one component of an overall dosimetry system which further comprises readers for the active and passive detectors 22 and 24 and a processor (or processors) which interrelate the radiation exposure information read from the detectors and determines a quantity of radiation exposure from the radiation information acquired from the detectors, such as effective dose, type of radiation, etc. Effective dose, as a measure of the type and severity of the measured radiation on the human body, may be determined from the response of the detectors through application of appropriate correction algorithms. For example, a neural network beta-gamma dose algorithm as described in copending U.S. patent application No. 08/326,606 may be used to convert the reader output from the TLD dosimeters to deep and shallow dose.

As will be appreciated by those skilled in the art, the active detector may be used to provide radiation readings at a frequency greater than the readings obtained from the passive detector. This provides an exposure history between passive detector readings as may be useful for a variety of reasons, such as real time access control. Also, the active detector functions as a real time indicator and may warn of high radiation levels and/or exposures.

Presently known active detectors heretofore have had some inherent shortcomings. For example, many commercially available electronic dosimeters overestimate low energy Gamma rays and underestimate Beta particles in a radiation field consisting of a mixture of Betas and Gammas. Also, electronic dosimeters have generally had difficulty accurately reporting mixtures of Gamma rays, X-rays and Beta particles.

The paired passive detector enables retroactive correction for these shortcomings of the active detector. For example, radiation energies and field mixtures can be more accurately determined from the radiation exposure information acquired from the passive detector. With this information, an appropriate algorithm may be applied to the data derived from the active dosimeter to correct same. As a result, either detector might be selected as the dosimeter of record for compliance purposes.

Another advantage is that one detector provides a check for the other detector, there is added assurance that the information reported is accurate. The doses reported by the detectors may be compared to determine if a problem exists.

The detectors may be independently or simultaneously calibrated. Simultaneous calibration ensures that the responses from each detector and at the calibration energy agree within a prescribed percentage. To eliminate or reduce the energy dependence of the selected radiation sensitive devices, multipoint calibration preferably is performed. The calibration data may be stored in tabular form and applied real time or in a delayed step to correct for the energy dependence.

The foregoing data corrections, modifications and comparisons may be implemented by a suitably programmed computer integrated into an overall dosimetry system.

The system processor, typically a suitably programmed digital computer, computers or network of computers, with associated peripherals, may be used to record and report radiation exposure information from both the active and passive detectors, and further to analyze the information to provide meaningful information to the radiation monitoring agent. The processor also may be used to track employee demographic data as well as the data acquired from the active and passive detectors. Through appropriate programming an organization's internal and external dosimetry reporting requirements can be met.

Figure 8:
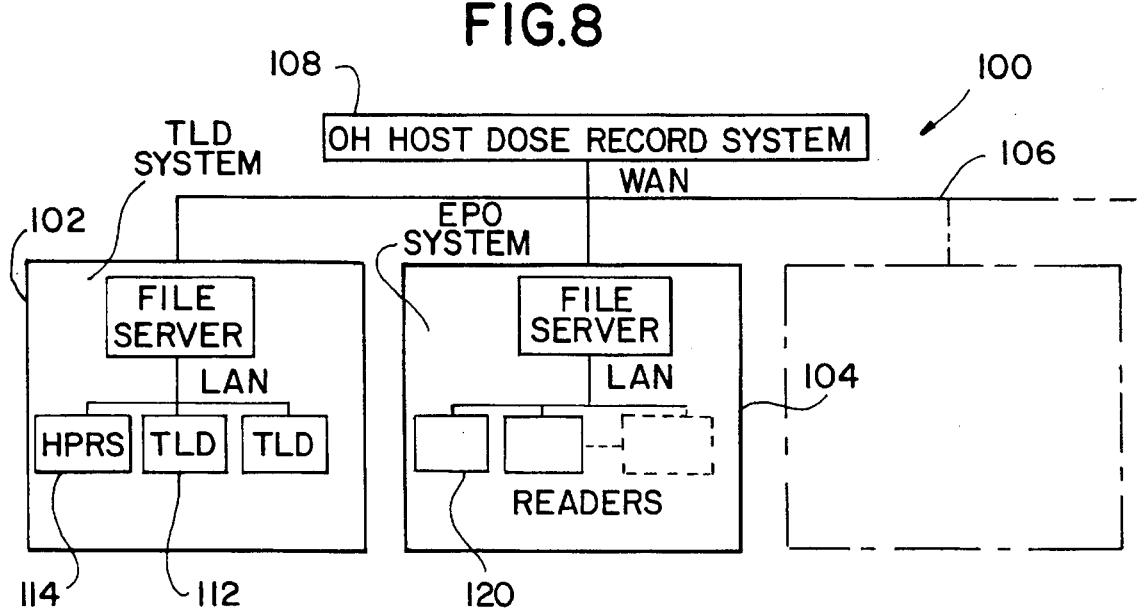
FIG. 8 is a diagrammatic view of a radiation dosimetry system according to the invention.

An example of one possible dosimetry system configuration is illustrated in FIG. 8. The illustrated system, generally indicated by reference numeral 100, comprises one or more TLD systems 102 and one or more electronic personal dosimeter (EPD) systems 104 networked over a wide area network (WAN) 106 to provide connectivity to a host or records management system 108. The system preferably is programmed to provide seamless integration of data from both the passive TLD system and the active EPD system. Preferably there is provided long term record management of the dose obtained from the TLD system, which may be the dose of record, and integration of daily readings from the active electronic dosimetry system. This ensures timely response to operational needs and complete record keeping for regulatory requirements. Dose records and raw data preferably are maintained to support tracking and reporting of personnel and dose information important to a health physicist or manager. This availability of information lends itself readily to ad hoc queries and reports.

The TLD system 102 in the illustrated exemplary system is composed of one or more conventional Model 6600 readers 112 that are available from Harshaw/Bicron Radiation Measurement Products, a division of SaintGobain/Norton Industrial Ceramics Corporation located in Solon, Ohio. The Model 6600 reader is capable of automatically reading both whole body and environmental TLD cards. A Model 6600E reader gives the additional capability of reading extremity dosimeters. The software which controls the reader and stores its output may be resident, on a network such as a local area network, or in this example on a computer associated with the reader. One reader and its computer, along with application software for managing acquisition, analysis of collected data and dose calculation, make a single, fully integrated workstation. Each workstation can process up to 200 whole body or environmental cards (or 400 extremity dosimeters in the Model 6600E) without operator attention, while performing a number of real-time quality checks on the operation to ensure the integrity of the data. Critical operating values may be constantly updated and displayed during data acquisition. In addition to online QC testing, an offline QA system may include electronic self-testing and reporting against user-set standards and calibration of the reader and each TL element, as is conventional. Each of these activities may be documented by a printed report.

Any number of TLD workstations may be connected to a local area network (LAN) or WAN. Workstations can share data, such as element correction coefficients (ECCs), and store data directly on the file server or host for further processing or storage. The TLD workstations may be networked on many platforms such as Novell, DEC DECNET, OS/2 Lan Manager, and UNIX server. Should the LAN or WAN be disabled, the workstations preferably should be able to function independently until the network has been restored. A typical computer configuration for the workstation is an IBM compatible with the following minimum requirements: hard disk drive of at least 100 megabyte capacity, 640 kilobyte RAM, two diskette drives, a Math Coprocessor, color graphics monitor, and an IBM-compatible printer.

The system may be controlled by Network Aware Harshaw Radiation Evaluation and Management System (NETREMS) software available from Harshaw/Bicron Radiation Measurement Products. The NETREMS software is available for several Harshaw readers. With the reader set in remote mode, NETREMS takes complete and automatic control of the instrument, providing powerful data handling capabilities, including reader and field card calibration and automatic application of element correction coefficients to field card readings; automatic TTP selection; data storage, selection and summarization; computerized glow curve deconvolution; and data exporting in a variety of formats.

The software also provides a common interface from the various readers to a central computer system. Results of read operations, including glow curves and computed data, are displayed on a display. In addition, the following instrument variables are continuously updated and displayed on a results screen at all times: type of reading, card ID, active TTP number and name, date and time of last card read, current date and time, read cycle phase, air temperature for both channels, high voltage value for both channels, nitrogen flow rate and supply temperature.

As TL material is read by the photomultiplier tube in the above identified TLD Reader, the output is expressed in nanocoulombs. The reader calibration factor (RCF) converts this output to the dosimetric units in which the reader is calibrated, such as rem. This simple conversion, however, often is inadequate for determining the effect of the measured radiation on the human body, especially considering the effects of different types of radiation at varying depths of human tissue. By using a variety of TL materials and placing the TL material behind different filters, as described above, the relative TL response of the materials can be evaluated to determine the type as well as the severity of the radiation, and thus estimate its effect on the body. These values are derived by processing the reader-generated data through an algorithm developed by analyzing exposures to known radiation fields. A number of such algorithms have been developed and are commercially available for environmental, extremity, and whole body dose estimation.

The EPD system in the illustrated exemplary system is composed of one or more conventional readers 120. Two different types of readers (Model 200B and Model 200, basic and smart) are available from Dositec, Inc., each being adaptable to a variety of networking concepts. Dositec, Inc. also provides DOSISYS dosimetry system software.

A Dositec Telemetry System includes teleboxes that use an infrared interface for communication with the Model L36 dosimeters. The telebox can easily provide multi-badging for up to five (5) dosimeters per telebox. The telemetry system is designed for two-way communication between the telebox and individual units. It has heretofore been used for the purpose of wireless monitoring of workers and/or entire areas, as well as for wireless calibration of dosimeters. The telebox transfers data to a base or control station.

The basic reader interfaces via a serial port to a host computer or other computer for further connectivity to a LAN/WAN. The smart readers may be connected directly to a LAN/WAN with an optional network interface adapter. The optional access control software residing on the smart reader provides for networked and stand alone operation. These readers may be networked on many standard network platforms. The smart reader can function totally independently should the network be unavailable.

The active detector system provides real-time access control enabling supervisory access to entry and exit data, personnel records, and RWP (radiation work permit) authorization information.

The Dositec Dosi-Reader Model 200 is based on a high performance 486 Processor. It can provide an access control and/or a record keeping system. The reader will not only record data but also will retain it. The reader consists of: an integrated computer with 120 MB hard disk, serial and parallel ports, dosimeter receptacle, a numeric keypad, and/or radiation check source. The reader communicates with the active detector through an infrared interface, eliminating the need for external switches and connectors. The reader can be used to calibrate either single or multiple dosimeters.

The base or control station can scan all units with a period variable from six seconds and up. The total number of units the base station can scan is dependent on the scanning frequency; for example, 1000 units at one minute scanning time or 2000 units at thirty seconds scanning time, for example. The base station operator has the ability to monitor both the exposure levels and dose rates of all units, and is also able to control each dosimeter's alarm settings. An individual's Telebox alarm will be automatically activated if he/she gets out of detection range of the base station.

As above indicated, the Model L36 dosimeter contains an energy compensated, solid-state silicon detector and employs a microprocessor to monitor and process data on the radiation rate and dose level. The dosimeter's detection circuit features include the following: 1) solid state Si- detector; 2) No high voltage, low maintenance. 3) energy response within 25% from 60 KeV to 6.2 MeV, 4) dose range 0–999 rem with increments of 1 mrem, 5) dose rate range 0–260 rem/hr with increments of 1 mrem/hr, 6) linearity from 0–100 rem/hr within±10% for both dose and rate, 7) field accurate within 10% of the TLD reading in the field, 8) dose rate response less than 5 seconds, 9) neutron response less than 1%, 10) fast recovery for radiation overrange, 7 times faster than specified in the IEC 45B 1991 Standard, and 11) minimum dose retrievable by the reader is 0.1 mrem. The detector/dosimeter is equipped with a programmable alarm indicated by a bright red LED equipped with a curved light guide for easy visibility from wide angles. The loudness of the audible alarm is 85–95 dBA@ 30 cm. The set point for dose alarm is from 1 mrem to 999 rem with increments of 1 mrem; the dose rate alarm can be set from 1 mrem/hr to 65 rem/hr with increments of 1 mrem/Hr. The dosimeter will also uniquely identify ¼, ½, ¾, and full scale 4-Level dose alarm. The chirp rate is adjustable to the following values: 0, 1, 2, 4, 8, 16, 32, 64, 128 and 256 mrem per chirp. The user may also set a reminder time alarm from 0.1 minute to 32 hours and a stay time alarm from 1 minute to 32 hours.

The memory in the Model L36 dosimeter will record 0.01 mrem as the minimum measurement dose which can be retrieved by the reader. The memory also records the peak dose rate and the dose history of up to 240 data intervals with programmable time for each data interval from 0.1 minute to 32 hours. It also stores the following operating data: dosimeter serial number, calibration numbers, and alarm settings. The Model L36 dosimeter may be calibrated by using either a standard Dositec reader or a computer with Dositec calibration software. The calibration may be performed at any level from 200 mrem/hr to 9 rem/hr. In addition to the calibration display on the unit, the following reports are available:

a. Last calibration data including: calibration date, dosimeter serial number, and calibration numbers.
  b. Verification data including: dosimeter serial number, calibration date, dose expected, dose measured, percent error, passing criteria, pass or fail, signature of the person performing the calibration.
  c. Linearity check report including: dosimeter serial number, calibration date and time, dose expected, dose measured, and percent error.
  d. Calibration history of the dosimeter including: dosimeter serial number, calibration date and time, and calibration numbers.

The following information may be retrieved from the dosimeter and stored by the reader:

1. Dosimeter dose from 0.1 mrem to 999 rem
  2. Peak dose rate from 1 mrem/Hr to 260 rem/Hr
  3. Dose history
  4. Worker's ID#, dose, dose margin, dose history of each entry, training information, entry and exit information, etc.
  5. Dosimeter calibration information The Dositec Software controls access through RWP (radiation work permit) authorization lists and exposure limits, maintained personnel exposure data and maintained dosimeter calibration data, all controlled through a Database Management System (DBMS) running on a computer. This system can operate stand-alone, can be networked with other PCs to share a common database, and can be interfaced to a host which can control the content of the DBMS with changes or additions to personnel or RWP data.

Calibration software allows simultaneous calibration of multiple dosimeters using a batch calibration program and calibration of a single dosimeter using a auto-timing calibration program. The software adjusts the dosimeter's calibration numbers and updates the system calibration files. The software also allows display and printout of the calibration information.

Although the invention has been shown and described with respect to a certain preferred embodiment, equivalent alterations and modifications will no doubt occur to others skilled in the art upon the reading and understanding of this specification. The present invention includes all such equivalent alterations and modifications, and is limited only by the scope of the following claims.

What is claimed is:

1. A radiation dosimeter comprising a passive detector and an active detector physically connected together as a unitary package, said active detector providing an output representative of radiation exposure on a real time basis, and said passive detector being readable on a delayed basis after exposure to radiation for a period of time to provide an output representative of radiation exposure over said period of time.

2. A dosimeter as set forth in claim 1, wherein said passive detector includes at least one radiation sensitive element selected from the group consisting of a TLD-based dosimeter element, bubble-based dosimeter element, polycarbonate-based dosimeter element, photographic film-based dosimeter element, indium-based dosimeter element, sulphur-based dosimeter element, quartz-based dosimeter element and gold-based dosimeter element.

3. A dosimeter as set forth in claim 1, wherein said active detector includes at least one radiation sensitive element selected from the group consisting of a silicon diode, photodiode, GM tube, ionization chamber, electret, MOSFET and DRAM.

4. A dosimeter as set forth in claim 1, comprising a housing, said active detector including an electronic radiation sensitive element within said housing, and said passive detector includes a TL element within said housing.

5. A dosimeter as set forth in claim 4, wherein said housing includes a case and a holder removably attached to said case, said case containing said electronic radiation sensitive element, and said holder containing said TL element.

6. A dosimeter as set forth in claim 5, including within said holder a substrate for carrying said TL element, and said substrate being removable from said holder.

7. A dosimeter as set forth in claim 6, wherein said holder includes a filter element overlying said TL element.

8. A dosimeter as set forth in claim 5, wherein said holder includes a pocket for slidably receiving said case.

9. A conversion device for converting an active dosimeter, that provides an output representative of radiation exposure on a real time basis, to an integrated active and passive dosimeter assembly, the active dosimeter including a case, comprising a holder attachable to said active dosimeter to form a unitary package, and at least one non-electronic dosimeter element carried by said holder.

10. A conversion device as set forth in claim 9, wherein said holder is removably attachable to said case.

11. A dosimeter as set forth in claim 9, wherein said holder includes a socket for slidably receiving said case.

12. A radiation monitoring method comprising the steps of using paired active and passive radiation detectors in a single assembly to monitor exposure to a radiation field, the active detector providing an output representative of radiation exposure on a real time basis while the passive detector is readable on a delayed basis after exposure to radiation for a period of time to provide an output representative of radiation exposure over said period of time.

13. A method as set forth in claim 12, including the step of simultaneously calibrating the active and passive detectors.

14. A method as set forth in claim 12, including the step of performing a multi-point calibration on each of said active and passive detectors.

15. A radiation monitoring system comprising a plurality of radiation dosimeters each comprising a passive detector and an active detector physically connected together as a unitary package, said active detector providing an output representative of radiation exposure on a real time basis, and said passive detector being readable on a delayed basis after exposure to radiation for a period of time to provide an output representative of radiation exposure over said period of time; respective readers for extracting the radiation exposure information from said detectors; and a processor which determines a quantity of radiation exposure from the radiation information extracted from the detectors, said processor modifying radiation exposure data derived from one of said detectors using radiation exposure data derived from the other of said detectors.

16. A radiation monitoring system as set forth in claim 15, including an electronic memory for storing incremental radiation exposure information provided by said active detector at intervals over said period of time, said reader for said active detector extracts the incremental radiation information from said active detector for providing a history of readings over said period of time, and said processor modifies the radiation exposure history using the radiation exposure data derived from said passive detector.

17. A radiation dosimeter comprising a housing, at least one nonelectronic radiation sensitive element carried by said housing and readable on a delayed basis after exposure to radiation for a period of time to provide an output representative of radiation exposure over said period of time, at least one electronic radiation sensitive element carried by said housing for providing an output representative of radiation exposure on a real time basis, and an electronic circuit responsive to the output of said electronic radiation sensitive element for producing an alarm if the output of said electronic radiation sensitive element satisfies a predetermined criteria.

* * * * *